ns patent office 3,394,112
Patented July 23, 1968

3,394,112
ANIONIC POLYMERIZATION OF ANHYDROUS LACTAMS WITH AMIDO ACETALS AS CO-CATALYSTS
Bernhard Stoll, Domat-Ems, Grisons, and Wolfgang Griehl, Chur, Grisons, Switzerland, assignors to Inventa A.G. für Forschung und Patentverwertung, Zurich, Switzerland
No Drawing. Filed Oct. 19, 1965, Ser. No. 498,124
Claims priority, application Switzerland, Oct. 30, 1964, 14,092/64
6 Claims. (Cl. 260—78)

The invention relates to the polymerization of anhydrous lactam. More particularly, it relates to the polymerization of lactams having more than 6 ring members in the presence of alkaline catalysts and to the use of specific co-catalysts.

It is known that anhydrous lactams having 7 and more ring members can be polymerized to high-molecular compounds with the aid of alkaline catalysts. It also is known that cyclic amides having 5 or more ring members can be polymerized by means of alkaline catalysts at temperatures below the melting point of the polymer formed if to the polymerization mass, in addition to the catalyst, other substances are added which accelerate the polymerization. These additional compounds are known as "co-catalysts," and a number of substances have been suggested for such use, e.g., N-acyllactams, organic isocyanates, substituted ureas and thioureas, carbodiimides, cyanamides, derivatives of carboxylic acids such as anhydrides, nitriles, haloids, esters, polyethers, and perhalogenated ketones (cf. U.S. 3,015,652; 3,018,273; 3,028,369). However, these known co-catalysts are not universally applicable as they do not fulfill their purpose equally well in each instance.

A salient feature of the anionic polymerization is the casting of the monomer, at a polymerization in a mould. This kind of polymerization primarily presents a caloric problem since the velocity of the polymerization and the speed of heat dissipation from the polymerizate must be in favorable proportion to each other so that local overheating in the mass and ensuing formation of bubbles, blisters and voids are precluded. In order to attain maximum strength of the polyamide formed, polymerization must proceed uniformly throughout the shaped body. If co-catalysts are employed which are active solely at temperatures above the melting point of the polymer, products are obtained which shrink upon cooling, i.e., they do not retain their predetermined shape. Shrinkage, moreover, leads to the formation of internal cavities. On the other hand, the use of co-catalysts of greatly accelerating effect easily induces local overheating which again leads to the formation of blisters, bubbles, cavities and, thus, inhomogeneity of the polyamide obtained. Furthermore, the mixing of the reaction components frequently meets with difficulties when the reaction proceeds very rapidly. Also, polymers produced by rapid polymerization frequently are more or less discolored. To have available as many variables as possible, the necessity is evident of finding novel co-catalysts over and above those known to date.

It now has been found, unexpectedly and surprisingly, that amidoacetals are highly suited as co-catalysts in the alkaline polymerization of lactams as described. This group of compounds assures a moderate and uniform course of the reaction so that they are especially valuable in the production of polyamides from cast monomers.

Particularly worth noticing is the conspicuously light color of the polyamides obtained with the use of this class of co-catalysts.

The process according to the invention for the polymerization of anhydrous lactam having more than 6 ring members in the presence of alkaline catalysts is characterized by the use of co-catalysts which are compounds of the generic Formula 1:

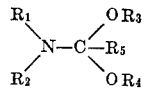

wherein:

$R_1$ and $R_2$ are an alkyl having 1–4 carbon atoms;
$R_3$ and $R_4$ are an alkyl having 1–6 carbon atoms or an aralkyl with no more than 8 carbon atoms; and
$R_5$ is either hydrogen or, together with $R_1$, an alkylene having 3–4 carbon atoms.

In the aralkyl groups $R_3$ and $R_4$, a phenyl also may be substituted, e.g., by a chlorine, methoxy or nitro group. The amidoacetals suitable for the purpose at hand are known per se and can be manufactured from the corresponding aldehydes or ketones by means of phosgene and sodiumalcoholates (cf. H. & K. Bredereck, B. 94, 2292 (1961)).

To carry out the polymerization, pure and dry lactam (for instance, a lactam recrystallized from ethylacetate) is mixed with catalyst and co-catalyst, and the mixture is heated to the polymerization temperature under exclusion of air and moisture. It is equally feasible to add catalyst and co-catalyst to the lactam which had been preheated to the polymerization temperature. Furthermore, catalyst and co-catalyst may separately be dissolved in lactam, and the two solutions combined in the mold which had been preheated to the polymerization temperature.

The process according to the invention lends itself to continuous and batchwise polymerization especially of caprolactam, but also of oenantholactam, caprylolactam, caprinolactam, laurolactam, the C-methyllactams, and mixtures of the several lactams.

The polymerization temperatures generally are lower than the melting point of the polymer, e.g., 140–200° C., and preferably 170–190° C.

Suitable alkaline catalysts are, in principle, all compounds commonly used for the purpose, especially Grignard compounds such as ethylmagnesiumbromide and phenylmagnesiumbromide; also alkali metal compounds, for instance, the corresponding lactam salts, hydrides, carbonates, hydroxides, alcoholates; and the corresponding alkaline earth compounds.

As co-catalysts, all compounds which correspond to Formula 1 can be employed, for instance, dimethoxy-N,N-dimethylaminomethane;
diethoxy-N,N-dimethylaminomethane;
dibutoxy-N,N-dimethylaminomethane;
dibenzyloxy-N,N-dimethylaminomethane;
benzyloxymethyloxy-N,N-dimethylaminomethane;
dibenzyloxy-N-methyl-N-ethylaminomethane;
1-methyl-2,2-diethoxypyrrolidine.

Preferred embodiments of the amidoacetals are those wherein $R_1$ and $R_2$ are $CH_3$; $R_3$ equals $R_4$; and $R_5$ is hydrogen (cf. Formula 1).

The quantities of catalyst and co-catalyst are substantially 0.1–10 mol percent per mol lactam, preferably however 0.2–2 mol percent.

The yields obtained with the process as described are excellent. The extract content of the polymers, i.e., the residual monomer content, regularly is kept at less than 5 percent and usually is substantially lower than that. The relative solution viscosities (determined in 0.5% m-cresol solution at 20° C.) depend upon the amount of catalysts and co-catalysts added, whereby increasing quantities lead to lower viscosities.

The process according to the invention yields pure white polyamides, especially at polymerization temperatures of substantially 170° C. using dimethylformamide-dibenzylacetal (dibenzyloxy - N,N - dimethylaminomethane) as co-catalyst. Table 1 shows comparative test results of rapid polymerization products (polycaprolactam) using different catalysts and co-catalysts at 170° C. The products were cut into discs, and their degree of remission determined in a Zeiss Elrepho instrument equipped with Filter R46.

polymer nor good extract content under the reaction conditions named without the aid of a co-catalyst.

EXAMPLE 4

90 g. epsilon-caprolactam (0.8 mol) were polymerized under the conditions set forth in Example 1 with 1.378 ml. (1.44 g.) dibenzyloxy-N,N-dimethylaminomethane ($\frac{1}{150}$ mol, calculated on lactam) and 1.225 ml. ethylmagnesiumbromide solution ($\frac{1}{200}$ mol, calculated on lactam). The polymerizate solidified after 100 minutes and, after a polymerization period of 5 hours, had an extract content of 3.3% and a solution viscosity $\eta_{rel}$ of 2.6.

TABLE 1

| Catalyst, mols | Co-catalyst, mols | Polym., h | Extract, Percent | Remission, degree |
| --- | --- | --- | --- | --- |
| $\frac{1}{250}$ Na | $\frac{1}{400}$ N-acetyllactam | 2 | 2.63 | 57.6 |
| $\frac{1}{200}$ C$_2$H$_5$MgBr | $\frac{1}{400}$ Biscaprolactimether | 1 | 3.93 | 57.7 |
| $\frac{1}{250}$ C$_2$H$_5$MgBr | $\frac{1}{300}$ Dimethylformamide-dimethylacetal | 3 | 3.78 | 70.9 |
| $\frac{1}{200}$ C$_2$H$_5$MgBr | $\frac{1}{300}$ Dimethylformamide-dibenzylacetal | 5 | 2.89 | 74.6 |

The invention now will be further illustrated by the following examples. However, it should be understood that these are given merely by way of explanation, and not of limitation, and that numerous changes may be made in the details without departing from the spirit and the scope of the invention as hereinafter claimed.

Temperatures recited are in °C., percentages are weight percent.

EXAMPLE 1

56.6 g. epsilon-caprolactam (0.5 mol) were heated to 200° C. in a glass cylinder while conducting dry nitrogen therethrough. The molten mass was allowed to remain at that temperature for 30 minutes in order to remove low-boiling impurities and traces of adhering water. The lactam then was cooled to approximately 150°, and successively 0.433 ml., corresponding to 0.453 g. or $\frac{1}{300}$ mol calculated on the lactam, of dibenzyloxy-N,N-dimethylaminomethane (density 1.046) and 0.617 ml. of a 43.2% ethylmagnesium-bromide solution in ethylether ($\frac{1}{250}$ mol calculated on the lactam) added, i.e., 100 ml. Grignard solution contained 43.2 g. C$_2$H$_5$MgBr. The mixture was heated at 170° C. in a nitrogen atmosphere until termination of the polymerization. This heating was carried out on a salt bath which was controllable to ±1° by means of a contact thermometer. The polymerizate began to solidify after 35 minutes, was solid after 90 minutes, and after a polymerization time of 3 hours had an extract content of 3.3% (determined on chips in boiling water) and a solution viscosity $\eta_{rel}$ of 3.4. The polymer thus obtained was white.

EXAMPLE 2

56.5 g. (0.5 mol) epsilon-caprolactam were polymerized in the manner described in Example 1 with 0.219 ml. (d. 0.909), corresponding to 0.199 g., dimethoxy-N,N-dimethylaminomethane ($\frac{1}{300}$ mol, calculated on the lactam) and 0.617 ml. ethylmagnesiumbromide solution ($\frac{1}{250}$ mol, calculated on the lactam). Solidification of the polymerizate began after 60 minutes and was completed after 2 hours. After a polymerization time of 3 hours, the white polymer had an extract content of 3.78% and a solution viscosity of $\eta_{rel}$ of 3.6.

EXAMPLE 3

56.5 g. epsilon-caprolactam were polymerized by the procedure described in Example 1 with 0.617 ml. ethylmagnesiumbromide solution, but without a co-catalyst. The polymerizate began to solidify at its surface after 80 minutes; however, even after a polymerization time of 3 hours it was not completely solid. The extract content was 17%.

This test shows that it is not possible to obtain a solid

EXAMPLE 5

90 g. epsilon-caprolactam were polymerized, as described in Example 1, with 0.698 ml. (0.645 g.) dimethoxy-N,N-dimethylaminomethane ($\frac{1}{150}$ mol, calculated on lactam) and 1.225 ml. ethylmagnesiumbromide solution ($\frac{1}{200}$ mol, calculated on lactam). The polymerizate solidified after 2 hours and, after 8 hours, had an extract content of 3.2% and a solution viscosity $\eta_{rel}$ of 2.9. Increasing amounts of catalyst and co-catalyst yielded polymers of lower solution viscosities.

EXAMPLE 6

90 g. epsilon-caprolactam were polymerized, as per Example 1, with 0.689 ml. (0.72 g.) dibenzyloxy-N,N-dimethylaminomethane ($\frac{1}{300}$ mol, calculated on the lactam) and 1.225 ml. ethylmagnesiumbromide solution ($\frac{1}{200}$ mol, calculated on the lactam) for different periods of time. The results are compiled in Table 2.

TABLE 2

| Polym. Time, hrs. | $\eta_{rel}$ | Extract Content, percent |
| --- | --- | --- |
| 2 | 3.1 | 3.90 |
| 3 | 3.2 | 3.20 |
| 5 | 3.1 | 2.90 |

The polymerization is practically complete after 2 hours when as co-catalyst dibenzyloxy-N,N-dimethylaminomethane is used. Solution viscosity and, thus, the degree of polymerization exhibit no change even upon prolonged reaction time.

EXAMPLE 7

56.5 g. epsilon-caprolactam were polymerized as described in Example 1. 0.578 g. 1-methyl-2,2-diethoxy-pyrrolidine ($\frac{1}{150}$ mol, calculated on the lactam) and 1.23 ml. ethylmagnesiumbromide solution ($\frac{1}{125}$ mol, calculated on the lactam) were used. The polymerizate solidified after 1 hour and, after 4 hours, had an extract content of 2.66% and a solution viscosity $\eta_{rel}$ of 2.26.

EXAMPLE 8

98.5 g. (0.5 mol) λ-laurolactam were heated to 220° C. in a glass cylinder while conducting nitrogen therethrough. The molten mass was kept at that temperature for 30 minutes to remove low-boiling impurities and traces of adhering water. The melt then was cooled to 195° C., 0.24 g. sodium hydride (50% solution in oil) added, i.e., $\frac{1}{100}$ mol. calculated on the lactam, and dissolved within one-half hour. The reaction vessel when was evacuated within 30 minutes, followed by an addition of 0.865 ml. dibenzyloxy-N,N-dimethylaminomethane ($\frac{1}{150}$ mol, calculated on the lactam). The reaction mixture then was polymerized at 200° in a nitrogen atmosphere. After 25 minutes, the melt was highly viscous. The extract content, determined on chips in boiling methanol, was 4.84% after polymerization time of 4 hours.

All co-catalysts previously named in this specification, gave corresponding results. Any inert gas, i.e., a gas not reactive with the components, can be used in lieu of nitrogen.

We claim as our invention:

1. In the polymerization of anhydrous lactams having more than 6 ring members under exclusion of oxygen and moisture and in the presence of a catalyst and a co-catalyst, the improvement which comprises using as said co-catalyst a compound having the formula

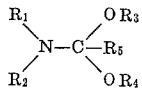

wherein:

$R_1$ and $R_2$ are an alkyl having 1–4 carbon atoms;

$R_3$ and $R_4$ are selected from the group consisting of an alkyl having 1–6 carbon atoms or an aralkyl having no more than 8 carbon atoms; and $R_5$ is selected from the group consisting of hydrogen or, combined with $R_1$, an alkylene having 3–4 carbon atoms.

2. The process as defined in claim 1, wherein $R_1$ and $R_2$ is $CH_3$ and $R_5$ is hydrogen.

3. The process as defined in claim 1, wherein said co-catalyst is selected from the group consisting of dimethyloxy-N,N-dimethylaminomethane, dibenzylboxy - N,N - dimethylaminomethane, 1-methyl-2,2-diethoxypyrrolidine, diethoxy-N,N-dimethylaminomethane, dibutoxy-N,N-dimethylaminomethane, and benzyloxymethyloxy-N-methyl-N-ethylaminomethane.

4. A process for the production of pure white polyamides having a residual monomer content of 5 weight percent or less, which comprises heating anhydrous lactams having more than 6 ring members under exclusion of moisture and air at 140–200° C. for substantially ½ to 5 hours in the presence of an alkaline catalyst and a co-catalyst in combined amounts of 0.1–10 mol percent, calculated on the latam, said co-catalyst being a compound of the formula

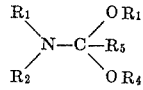

wherein:

$R_1$ and $R_2$ are an alkyl having 1–4 carbon atoms;

$R_3$ and $R_4$ are selected from the group consisting of an alkyl having 1–6 carbon atoms or an aralkyl having no more than 8 carbon atoms; and $R_5$ is selected from the group consisting of hydrogen or, combined with $R_1$, an alkylene having 3–4 carbon atoms.

5. The process as defined in claim 4, wherein $\frac{1}{50}$ to $\frac{1}{500}$ mol of said co-catalyst is employed per mol lactam.

6. The process as defined in claim 4, wherein said catalyst is selected from the group consisting of Grignard compounds, alkali metal and alkaline earth salts of lactams, their hydrides, carbonates, hydroxides and alcoholates.

References Cited
UNITED STATES PATENTS 3,138,576  6/1964  Anderson et al. _____ 260—78

WILLIAM H. SHORT, *Primary Examiner.*

H. D. ANDERSON, *Assistant Examiner.*